(12) United States Patent
Chiasson et al.

(10) Patent No.: US 7,142,752 B2
(45) Date of Patent: Nov. 28, 2006

(54) BUFFERED OPTICAL WAVEGUIDES

(75) Inventors: David W. Chiasson, Edmonton (CA);
Craig M. Conrad, Hickory, NC (US);
William C. Hurley, Hickory, NC (US);
Donald R. Parris, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 35 days.

(21) Appl. No.: 10/836,715

(22) Filed: Apr. 30, 2004

(65) Prior Publication Data
US 2005/0244114 A1 Nov. 3, 2005

(51) Int. Cl.
*G02B 6/44* (2006.01)

(52) U.S. Cl. ...................... 385/100; 385/102

(58) Field of Classification Search ............... 385/100, 385/102, 123–128
See application file for complete search history.

(56) References Cited

U.S. PATENT DOCUMENTS

| | | | | |
|---|---|---|---|---|
| 4,072,400 A | | 2/1978 | Claypoole et al. | 350/96.3 |
| 4,456,331 A | * | 6/1984 | Whitehead et al. | 385/105 |
| 4,515,435 A | | 5/1985 | Anderson | 350/96.23 |
| 4,577,925 A | | 3/1986 | Winter et al. | 350/96.23 |
| 4,768,860 A | | 9/1988 | Tatsukami et al. | 350/96.34 |
| 4,844,578 A | | 7/1989 | Pierini et al. | 350/96.34 |
| 4,893,893 A | | 1/1990 | Claxton et al. | 385/96.23 |
| 5,002,359 A | | 3/1991 | Sayegh | 350/96.23 |
| 5,011,260 A | | 4/1991 | Marx et al. | 350/96.23 |
| 5,024,506 A | | 6/1991 | Hardin et al. | 350/96.23 |
| 5,067,830 A | * | 11/1991 | McAlpine et al. | 385/114 |
| 5,181,268 A | | 1/1993 | Chien | 385/128 |
| 5,253,317 A | | 10/1993 | Allen et al. | 385/109 |
| 5,253,318 A | | 10/1993 | Sayegh et al. | 385/114 |
| 5,408,564 A | | 4/1995 | Mills | 385/128 |
| 5,987,204 A | | 11/1999 | Lee et al. | 350/100 |
| 6,148,130 A | | 11/2000 | Lee et al. | 385/100 |
| 6,185,155 B1 | * | 2/2001 | Steinich | 367/140 |
| 6,404,962 B1 | | 6/2002 | Hardwick, III et al. | 385/114 |
| 6,714,713 B1 | | 3/2004 | Lanier et al. | 385/128 |
| 6,957,000 B1 | | 10/2005 | McAlpine et al. | 385/102 |
| 2004/0086242 A1 | * | 5/2004 | McAlpine et al. | 385/102 |

* cited by examiner

*Primary Examiner*—Sung Pak
*Assistant Examiner*—Tina M. Wong
(74) *Attorney, Agent, or Firm*—Michael E. Carroll, Jr.

(57) ABSTRACT

A buffered optical waveguide includes an optical waveguide having a core, a cladding, and at least one coating and a buffer layer. The buffer layer being disposed around the optical waveguide for protecting the same so that the coupling/adhesion of the buffer layer is reduced. In one embodiment, at least one coating on the optical waveguides has an undulating profile for reducing contact area of the optical waveguide, thereby reducing coupling/adhesion of the buffer layer thereto. In another embodiment, the buffer layer has an internal profile with at least one recessed portion that extends along a longitudinal length of the buffer layer for reducing the contact area of the buffer layer for reducing coupling adhesion thereto. In preferred embodiments, the buffered optical waveguide is about 900 microns or smaller.

33 Claims, 5 Drawing Sheets

BUFFERED OPTICAL WAVEGUIDES

RELATED APPLICATIONS

The present application is related to U.S. patent application Ser. No. 10/836,713 titled "Buffered Optical Waveguides" filed on even date herewith, the disclosure of which is incorporated herein by reference.

FIELD OF THE INVENTION

The present invention relates generally to fiber optic waveguides. More specifically, the invention relates to buffered optical waveguides where the adhesion between a buffer layer and optical waveguide is tailored, thereby influencing the stripability of the buffer layer.

BACKGROUND OF THE INVENTION

Optical waveguides are used for transporting a variety of signals such as voice, video, data transmission, and the like. Optical waveguides are relatively fragile and can experience relatively high increases in optical attenuation when subjected to tensile, bending, or torsional stresses and/or strains. Consequently, optical waveguides may include a buffer layer therearound for protecting the optical waveguide.

FIG. 1 depicts a conventional buffered optical waveguide 7. Conventional buffered optical waveguide 7 includes an optical waveguide 1, an interfacial layer 3, and a buffer layer 5. Optical waveguide 1 generally includes a core 1a, a cladding 1b, and a coating 1c. Core 1a has an index of refraction that is greater than that of cladding 1b, thereby promoting internal reflection for transmitting optical signals along the waveguide. At the time of manufacture, cladding 1b is typically coated with one or more coatings 1c such as a UV-curable acrylate polymer, thereby protecting cladding 1b from being damaged. Typical diameters for the optical waveguide are about 10 microns for a single mode core or 50–62.5 microns for a multimode core, 125 microns for the cladding, and 250 microns for the coating, but other dimensions can be manufactured.

As shown, buffer layer 5 generally surrounds optical waveguide 1 and protects optical waveguide 1 from stresses and/or strains. Buffer layer 5 typically has an outer diameter of about 900 microns, but other suitable dimensions such as 500 microns are possible. Buffer layer 5 is generally extruded over optical fiber 1 in a relatively hot liquid form and quenched in a water trough to form a buffered optical waveguide. However, before an optical connection to the optical fiber can be made buffer layer 5 must be stripped from optical waveguide 1. End users have generic requirements for the stripability of buffer layer 5 from optical fiber 1 so that optical connections can easily be performed. For example, the GR-409 standard requires a minimum, and a maximum, force to strip a predetermined length such as 15 mm of buffer layer 5 from optical waveguide 1. To meet these requirements, some buffered optical fibers use an interfacial layer 3 that acts as a lubricant between the coating 1c of optical waveguide 1 and buffer layer 5, thereby aiding stripability. However, providing lubricant increases manufacturing complexity and increases manufacturing costs. Moreover, there are applications that require stripping long lengths such as 50 cm or more of buffer layer 5 from optical waveguide 1. In order to avoid damage to optical waveguide 1, stripping long lengths of buffer layer 5 is typically accomplished by stripping several shorter lengths of buffer layer 5 until the desired length of buffer layer 5 is stripped from optical waveguide 1. Stripping several shorter lengths is a laborious and time-consuming process. Thus, there is a need for an easy to manufacture, low-cost buffered optical waveguide that allows stripping of relatively long lengths of the buffer layer.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
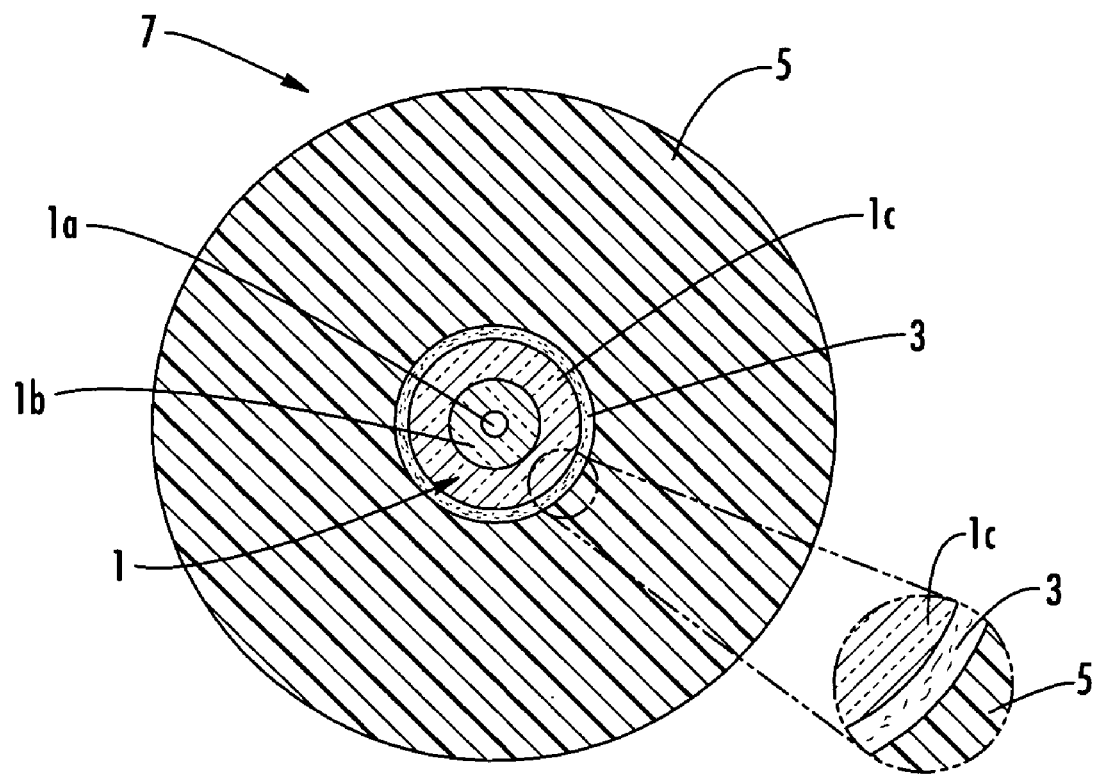
FIG. 1 is a cross-sectional view of a conventional tight-buffered optical waveguide.
Figure 2:
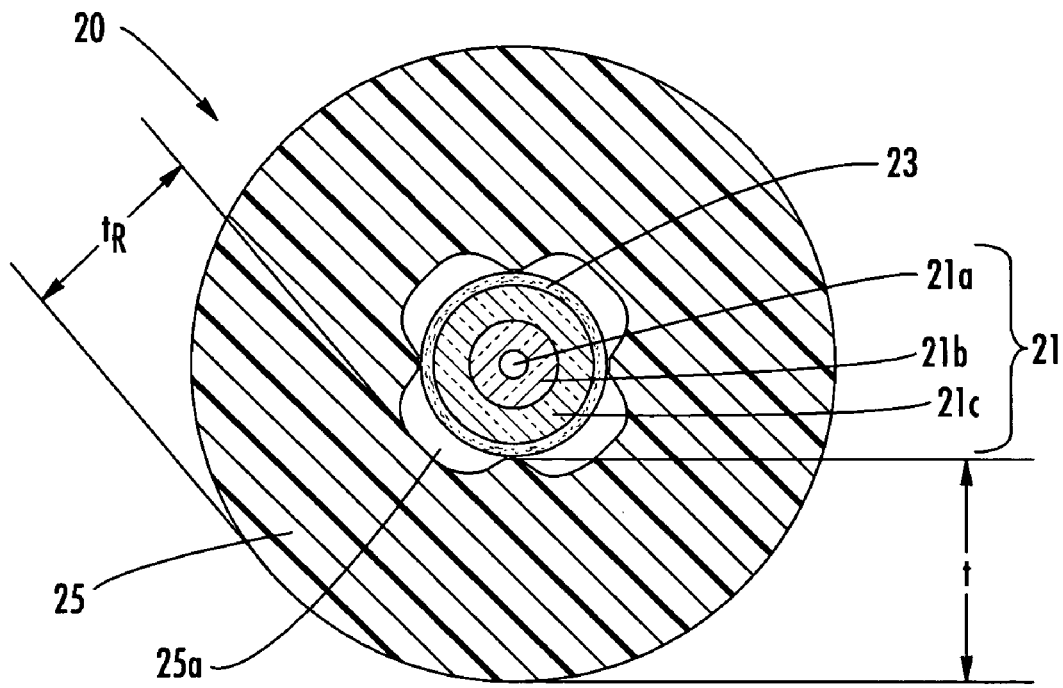
FIG. 2 is a cross-sectional view of a buffered optical waveguide according to the present invention.

FIG. 2 depicts buffered optical waveguide 20 (hereinafter buffered waveguide) according to the present invention. Buffered waveguide 20 includes an optical waveguide 21 and a buffer layer 25 with an optional release layer 23 disposed therebetween. Optical waveguide 21 includes a core 21a, a cladding 21b, and at least one coating 21c. Buffer layer 25 has a predetermined maximum wall thickness t and generally surrounds optical waveguide 21, thereby protecting the same. Buffer layer 25 has an inner profile that has at least one recessed portion 25a that extends along a longitudinal length of buffer layer 25. At the recessed portion 25a, a minimum wall thickness $t_r$ is less than the wall thickness t so that at this point buffer layer 25 is spaced away from optical waveguide 21. The ratio of $t_r/t$ is less than one and preferably about 0.95 or less, more preferably about 0.9 or less. In this embodiment, buffer layer 25 has four recessed portions 25a that are generally disposed in a symmetrical orientation about buffer layer 25. In other words, the contacting surface area between buffer layer 25 and optical waveguide 21 has been reduced. Consequently, the coupling/adhesion between buffer layer 25 and optical waveguide 21 may be influenced by tailoring recessed portions. Additionally, since the coupling/adhesion can be influenced the use of release layer 23 disposed on optical waveguide 21 may not be required; however, release layer 23 may be useful in some applications.

Buffer layer 25 can be either tight or loose on optical waveguide 21 depending on the desired degree of coupling between optical fiber 21 and buffer layer 25. The size and/or number of recessed portions 25a can influence the degree of coupling. Additionally, the recessed portions may inhibit post-extrusion radial and longitudinal stress and shrinkage because having recessed portions reduces the hoop strength of the buffer layer. The at least one recessed portion 25a may have different orientations on the inner profile of buffer layer 25. By way of example, recessed portion 25a can have a straight lay, helical lay, or reversing helical lay on the inner profile of buffer layer 25. Recessed portions 25a that have a helical or reversing helical lay may be advantageous for inhibiting polarized mode dispersion (PMD) characteristics since they result in contact points with optical waveguide 21 having more of a random pattern. On the other hand, there may be applications where the PMD is desirable so that recessed portions 25a having a straight lay is preferred.

Buffer layers of the present invention should not be confused with a buffer tube or a cable jacket. Buffer tubes typically include one or more optical fibers disposed within the buffer tube that float in a water-blocking grease, i.e., thixotropic gel. Moreover, buffer tubes generally have a relatively large inner diameter when compared to the outer diameter of the optical waveguide therein. Furthermore, a water-blocking grease should not be confused with a release layer. Water-blocking grease is used for inhibiting the migration of water with the buffer tube and to provide coupling, whereas the release layer is used for improving stripability of the buffer layer from the optical waveguide. Moreover, buffer layers are generally coupled with the optical waveguide.

Suitable materials for buffer layers of the present invention include polymeric materials; however, other materials such as radiation curable materials are possible. By way of example, buffer layer may be formed from a polyvinylchloride (PVC) such as available from the AlphaGary Corporation of Leominster, Mass. under the tradename of GW 2052 Special with an outer diameter (OD) of about 900 microns. Other ODs for buffer layer 25 such as 700 or 500 microns as well as other suitable dimensions are possible. Likewise, other suitable materials and/or configurations are possible for buffer layer 25 such as foamed polymers or multi-layers as discussed herein. For instance, buffer layers can also include additives for improving characteristics such as flame-retardance, but other suitable additives can be added for other purposes.

In this embodiment, optical waveguide 21 is a single mode optical fiber having a silica-based core 21a that is surrounded by a silica-based cladding 21b having a lower index of refraction than the core, thereby making it operative to transmit optical signals. Additionally, one or more coatings 21c are applied to over the cladding, thereby protecting the optical waveguide and/or identifying the same. For example, a soft primary coating surrounds the cladding, and a relatively rigid secondary coating surrounds the primary coating. The coating can also include an identifying means such as ink or other suitable indicia for identification of the optical fiber. A coating or further layer of the optical waveguide may include lubricants applied after the manufacture of the optical fiber that are intended to improve the stripability of the tight buffer layer from the optical fiber by conventional stripping methods. Additionally, other suitable optical waveguides can be used with the concepts of the present invention such as multi-mode, plastic optical fibers, erbium doped, polarization-maintaining, photonic, specialty, or any other suitable optical waveguide.

Figure 3:
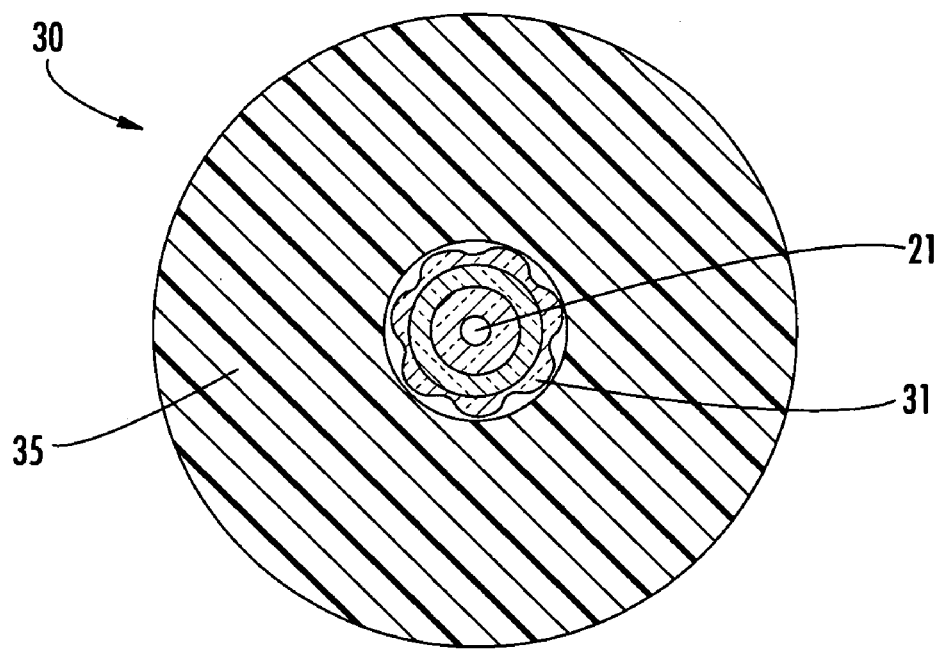
FIG. 3 is a cross-sectional view of another buffered optical waveguide according to the present invention.

Buffered waveguide 20 also includes optional release layer 23 that provides a lubricant for stripping buffer layer 25 from optical waveguide 21. Release layer 23 is generally applied to an outer surface of optical waveguide 21 and generally speaking improves strip performance. Release layer 23 can be formed from any suitable material(s) or compositions such as silicone oils, but other suitable release layers are possible. By way of example, U.S. Pat. No. 5,181,268 discloses a solid lubricant such as polytetrafluoroethylene and a non cross-linked film-forming binder for use as a release layer. Other configurations for release layer 23 include a solid lubricant disposed in a cross-linked film-forming binder that is UV curable as disclosed in U.S. Pat. No. 5,408,564. Furthermore, release layer 23 may comprise an acrylate having oligomers and monomers and a reactive release substance within a matrix as disclosed in U.S. patent application Ser. No. 09/771,672 filed on Jan. 29, 2001. Specifically, the reactive release substance such as reactive silicone has molecularly functional groups and at least some of the molecularly functional groups cross-link with the matrix. The disclosures of all of the above mentioned patents and patent application relating to release layer 23 are incorporated herein by reference. Of course, the release layer is optional for any of the embodiments disclosed herein and can have any suitable thickness or shape such as an undulating profile as shown in FIG. 3. Furthermore, other suitable materials are possible for the release layer.

FIG. 3 shows another buffered waveguide 30 according to the concepts of the present invention. In this embodiment, optical waveguide 21 has a coating or further layer 31 upcoated thereon with an undulating profile, thereby providing a surface that reduces the contact area between further layer 31 and a buffer layer 35 so that coupling/adhesion between the two may be tailored. In other words, buffer layer 35 with a generally uniform wall thickness merely contacts the high points of the undulating profile of optical waveguide 31, thereby reducing the surface area contact points without modifying buffer layer 35. Illustratively, a standard optical waveguide 21 having an outer diameter of about 250 microns is upcoated so that the respective largest and smallest diameters of the undulating profile are about 400 and 300 microns. However, other suitable dimension may be used and the undulating profile could be produced in the coating of the optical fiber, rather than using a further layer.

Figure 4:
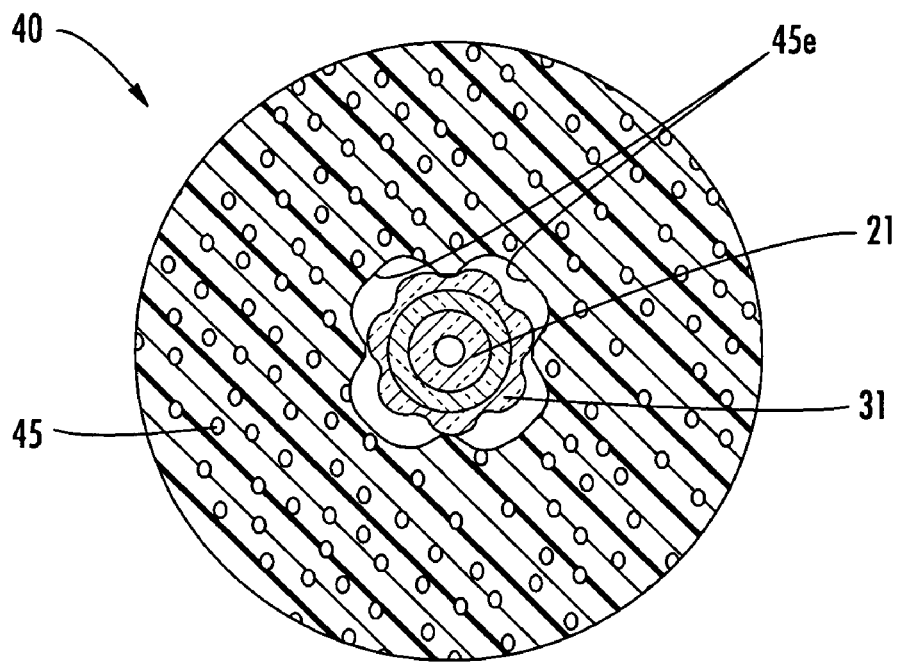
FIG. 4 is a cross-sectional view of yet another buffered optical waveguide according to the present invention.

FIG. 4 depicts buffered waveguide 40 according to another embodiment of the present invention. Buffered waveguide 40 includes optical waveguide 21 having further layer 31 with an undulating profile and a buffer layer 45. In this embodiment, buffer layer 45 has a plurality of recessed portions 45a and is formed from a foamed material. Since both further layer 31 and buffer layer 45 have undulating surfaces or recessed portions the contact between the two is further reduced. However, the foamed buffer layer 45 is also useful with an optical waveguide that is not upcoated with a further layer.

The foamed material of buffer layer 45 may be created by chemical, mechanical, thermal, or other suitable means. Foamed material allows for cushioning of the optical waveguide by providing compressibility to the buffer layer. Stated another way, cushioning provided by the foamed material may preserve the optical performance of the optical waveguide under certain conditions since the foamed material can compress. Moreover, compressive forces are distributed over a greater area, thereby reducing compressive stress. Consequently, foamed buffered layers allow compressibility of the buffer layer when cabled to increase packing density, but allows the buffer layer to expand to its uncompressed dimension when removed from the cable for standard connectorization assembly. Furthermore, materials cost may be decreased since the less material is necessary.

Figure 5:
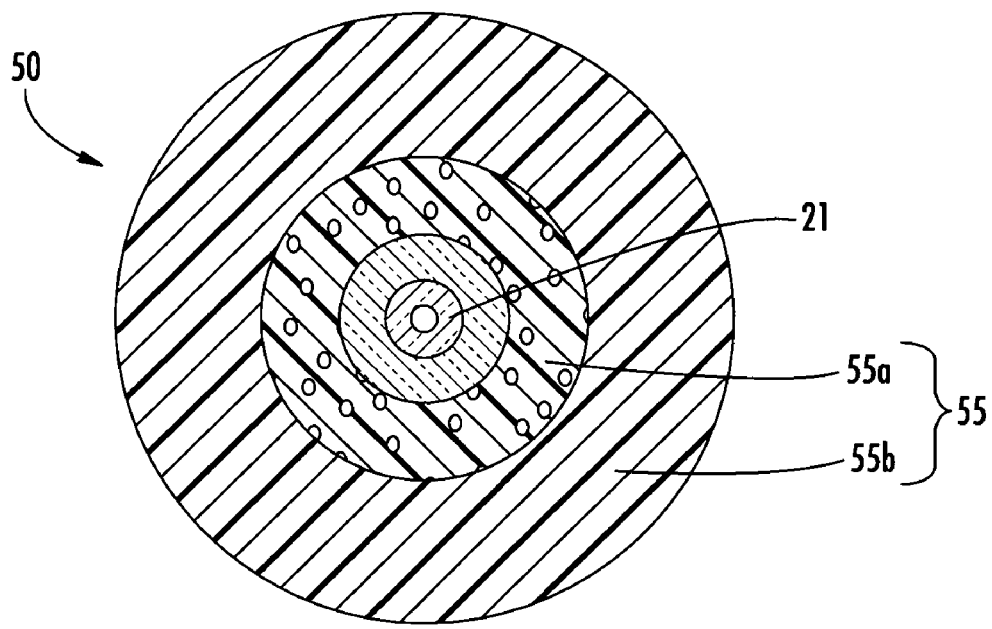
FIGS. 5–7 are cross-sectional views of buffered optical waveguides according to the present invention using a plurality of materials for the buffer layer.
Figure 6:
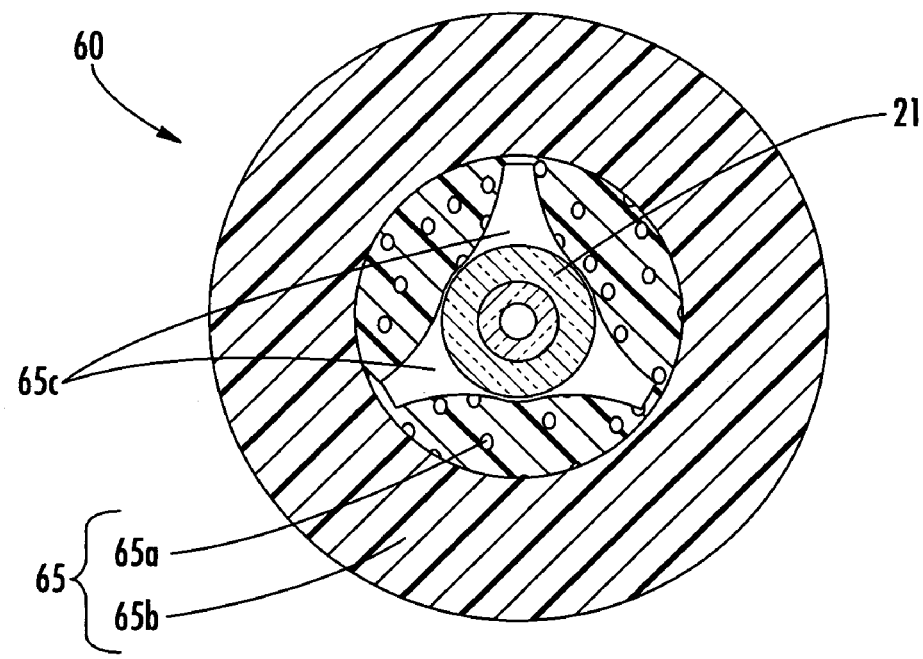

FIG. 5 depicts buffered waveguide 50 according to another embodiment of the present invention. Buffered waveguide 50 includes optical waveguide 21 and a buffer layer 55 formed from a plurality of materials. As shown, buffer layer 55 has an inner material 55a and an outer material 55b, but different configurations of the buffer layer may include more materials. In this embodiment, inner material 55a is formed from a foamed polymer and provides cushioning to optical waveguide 21. On the other hand, outer layer 55b is formed from a harder polymer such as PVC and provides, for instance, crush resistance to buffered waveguide 50. In other words, a softer material is used adjacent to optical waveguide 21 for cushioning and preserving optical performance and a harder material is used as an outer shell. Of course, other material combinations may be employed in a dual-layer configuration. By way of example, optical waveguide 21 has an outer diameter of about 250 microns, inner layer 55a is a foamed polymer having an outer diameter of about 600 microns, and outer layer 55b is a PVC having an outer diameter of about 900 microns. Other suitable dimensions are also possible and overall outer diameter can exceed 900 microns. FIG. 6 depicts buffered waveguide 60, which is similar buffered waveguide 50. As shown, inner layer 65a includes three recessed portions 65c that are generally symmetrically disposed about inner layer 65a. Thus, the contact area between inner layer 65a and optical waveguide 21 is reduced so that coupling/adhesion between the two can be tailored.

Figure 7:
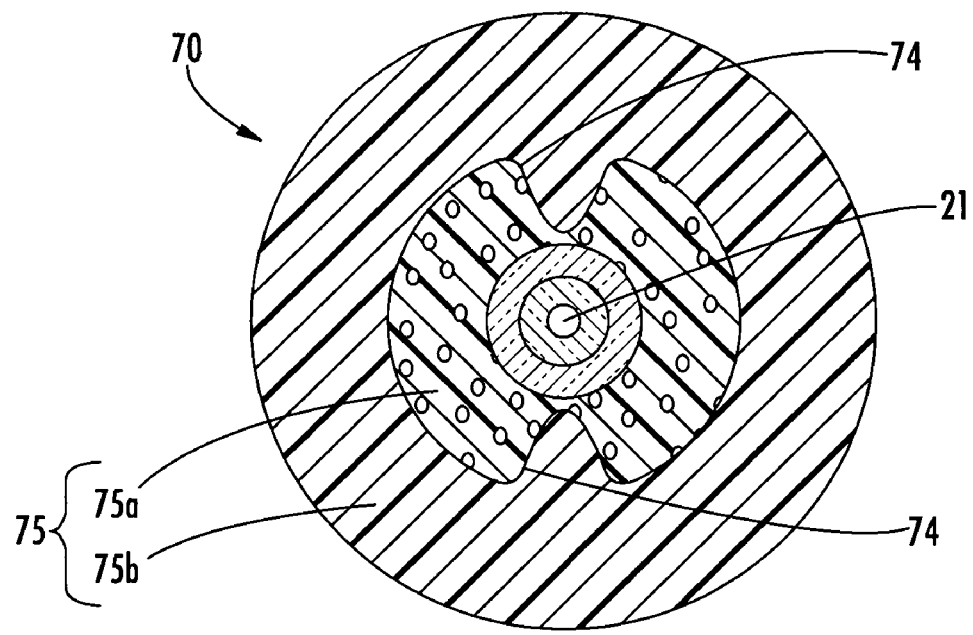

FIG. 7 depicts still another buffered waveguide 70 having a buffer layer 75 with a plurality of materials. Like FIGS. 5 and 6, buffer layer 75 includes an inner layer 75a formed from a foamed material and an outer polymer layer 75b; however, inner layer 75a has a non-round shape. As shown, inner layer 75a has two dimples 74 that are spaced about 180 degree apart, but other embodiments can have more dimples with other spacings therebetween and/or other depths and widths. Dimples 74 allow outer layer 75b to approach, and even contact, optical waveguide 21, thereby influencing the transfer of forces that may reach optical waveguide 21. For instance, the way dimples 74 are spaced and shaped allows the transfer of forces from outer layer 75b to optical waveguide 21 to generally occur at locations 180 degrees apart along the dimples. Thus, this particular embodiment may influence PMD. For instance, if the dimples are not rotated about the longitudinal axis PMD may be increased and if the dimples are rotated about the longitudinal axis PMD may be inhibited. Furthermore, although preferred embodiments have outer diameters that are generally round, other configurations can have other suitable shapes other than round such as elliptical.

Figure 8:
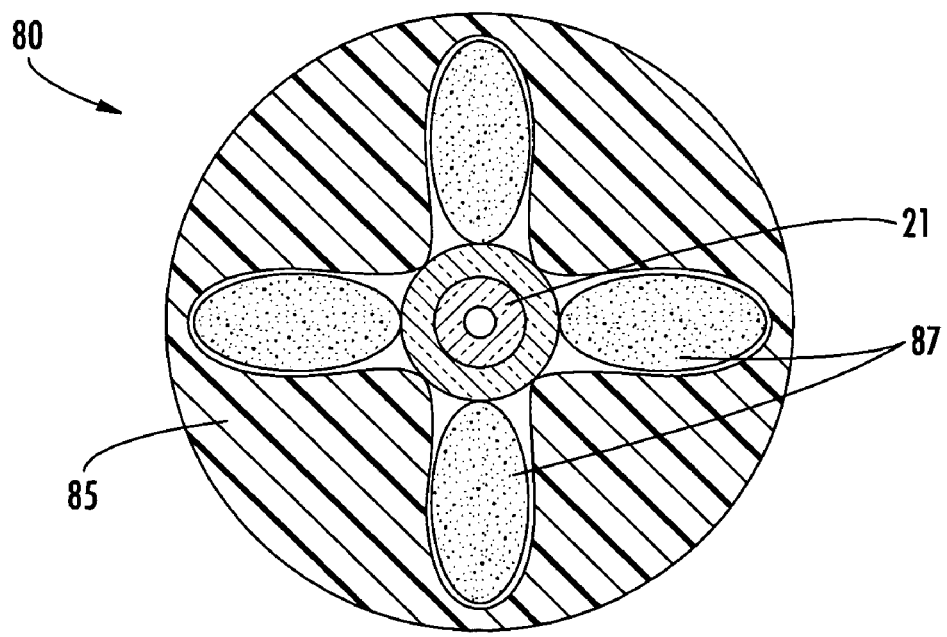
FIG. 8 is a cross-sectional view of another buffered optical waveguide according to the present invention.

FIG. 8 depicts another buffered waveguide 80 according to the concepts of the present invention. Buffered waveguide 80 includes optical waveguide 21, at least one filament 87, and a buffer layer 85. In this case, buffered waveguide 80 includes filaments in four positions that are generally speaking equally spaced about optical waveguide 21, but different numbers of positions and/or spacings can be used. Placing filaments 87 adjacent to or in contact with optical waveguide 21 or the release layer thereon generally reduces the contact area of the buffer layer, thereby reducing coupling/adhesion of the buffer layer. Filaments 87 may also serve as strength components. Additionally, filaments 87 may also act as ripcords for removing the buffer layer in long lengths. Filaments 87 can be formed from any suitable material such as aramid fibers, polyester, glass strands, nylon, combinations thereof, or composite materials. Filaments can also have a helical or S-Z strand to impart a non-preferential bend to the assembly. Additionally, buffer layer 85 may include more than one material such as an inner foamed polymer and an outer polymer. Likewise, the buffer layer may include one or more recessed portions.

Figure 9:
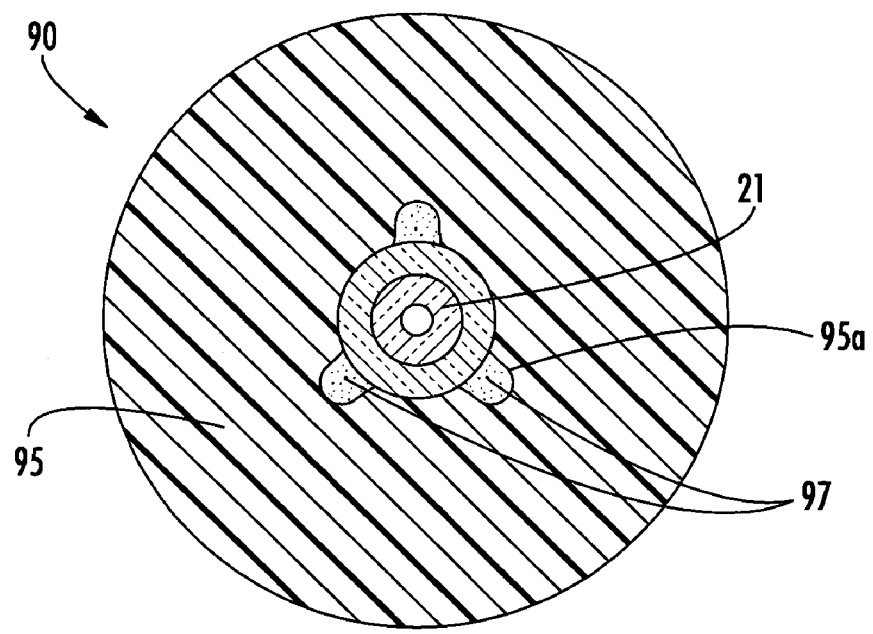
FIG. 9 is a cross-sectional view of another embodiment of a buffered optical waveguide according to the present invention.

Yet another embodiment of the present invention is depicted in FIG. 9. Buffered waveguide 90 includes optical waveguide 21, a buffer layer 95 having at least one recessed portion 95a, and a thixotropic material 97. In this embodiment, recessed portion 95a is at least partially filled with a thixotropic material such as grease. Like other embodiments, buffer layer 95 may include more than one material such as an inner foamed polymer and an outer polymer. Likewise, the buffer layer may include any suitable number of recessed portions with different shapes and/or spacings.

Many modifications and other embodiments of the present invention, within the scope of the appended claims, will become apparent to a skilled artisan. For example, buffered waveguides according to the present invention may used in breakout cables or jumper cables. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations.

That which is claimed:

1. A buffered optical waveguide comprising:
an optical waveguide, the optical waveguide having a core, a cladding, and at least one coating, the at least one coating having an undulating profile for reducing a contact area of the optical waveguide;
and a buffer layer, the buffer layer being disposed around the optical waveguide, the buffer layer having an internal profile, the internal profile having at least one recessed portion that extends along the longitudinal axis of the buffer layer, the at least one recessed portion being at least partially filled with thixotropic material.

2. The buffered optical waveguide of claim 1, the at least one recessed portion being one of a plurality of recessed portions that are generally disposed in a symmetrical orientation about the buffer layer.

3. The buffered optical waveguide of claim 1, at least a portion of the buffer layer being formed from a polymer.

4. The buffered optical waveguide of claim 1, at least a portion of the buffer layer being a foamed material.

5. The buffered optical waveguide of claim 1, at least a portion of the buffer layer being formed from a polyvinylchloride.

6. The buffered optical waveguide of claim 1, at least a portion of the buffer layer being a flame-retardant material.

7. The buffered optical waveguide of claim 1, further comprising a release layer disposed between the optical waveguide and the buffer layer.

8. The buffered optical waveguide of claim 1, the buffer layer having an outer diameter that is about 900 microns or less.

9. The buffered optical waveguide of claim 1, the buffer layer comprising two or more materials.

10. The buffered optical waveguide of claim 1, further comprising at least one filament, thereby reducing the contact area of the buffer layer.

11. A buffered optical waveguide comprising:
a single optical waveguide, the single optical waveguide having a core, a cladding, and at least one coating; and
a buffer layer, the buffer layer being disposed about the single optical waveguide and being at least partially formed from a foamed polymer, wherein the internal profile has at least one recessed portion that extends along a longitudinal axis of the buffer layer for reducing a contact area between the buffer layer and the single optical waveguide and the at least one recessed portion being at least partially filled with a thixotropic material.

12. The buffered optical waveguide of claim 11, the at least one recessed portion being rotated about the single optical waveguide.

13. The buffered optical waveguide of claim 11, the at least one recessed portion being one of a plurality of recessed portions that are generally disposed in a symmetrical orientation about the buffer layer.

14. The buffered optical waveguide of claim 13, the plurality of recessed portions being rotated about the buffer layer.

15. The buffered optical waveguide of claim 11, at least a portion of the buffer layer being a flame-retardant material.

16. The buffered optical waveguide of claim 11, further comprising a release layer disposed on the single optical waveguide.

17. The buffered optical waveguide of claim 11, the single optical waveguide having an outer coating, the outer coating having an undulating profile for reducing a contact area of the optical waveguide.

18. The buffered optical waveguide of claim 11, the buffer layer having an outer diameter that is about 900 microns or less.

19. The buffered optical waveguide of claim 11, the buffer layer comprising two or more materials.

20. The buffered optical waveguide of claim 11, further comprising at least one filament, thereby reducing the contact area of the buffer layer.

21. A buffered optical waveguide comprising:
a single optical waveguide, the single optical waveguide having a core, a cladding, and at least one coating; and
a buffer layer, the buffer layer being disposed about the single optical waveguide and having an internal profile, the internal profile having at least one recessed portion that extends along a longitudinal length of the buffer layer for reducing a contact area between the buffer layer and the single optical fiber and the at least one recessed portion being at least partially filled with a thixotropic material.

22. The buffered optical waveguide of claim 21, the at least one recessed portion being rotated about the buffer layer.

23. The buffered optical waveguide of claim 21, the at least one recessed portions being one of a plurality of recessed portions that are generally disposed in a symmetrical orientation about the buffer layer.

24. The buffered optical waveguide of claim 23, the plurality of recessed portions being rotated about the buffer layer.

25. The buffered optical waveguide of claim 21, at least a portion of the buffer layer being formed from a polymer.

26. The buffered optical waveguide of claim 21, at least a portion of the buffer layer being a foamed material.

27. The buffered optical waveguide of claim 21, at least a portion of the buffer layer being formed from a polyvinylchloride.

28. The buffered optical waveguide of claim 21, at least a portion of the buffer layer being a flame-retardant material.

29. The buffered optical waveguide of claim 21, further comprising a release layer disposed between the single optical waveguide and the buffer layer.

30. The buffered optical waveguide of claim 21, the at least one coating of the single optical waveguide having an undulating profile for reducing a contact area of the single optical waveguide.

31. The buffered optical waveguide of claim 21, the buffer layer having an outer diameter that is about 900 microns or less.

32. The buffered optical waveguide of claim 21, the buffer layer comprising two or more materials.

33. The buffered optical waveguide of claim 21, further comprising at least one filament.

* * * * *